June 21, 1960 B. E. TOMLINSON 2,941,885
MILKSHAKE ART
Filed Feb. 18, 1957
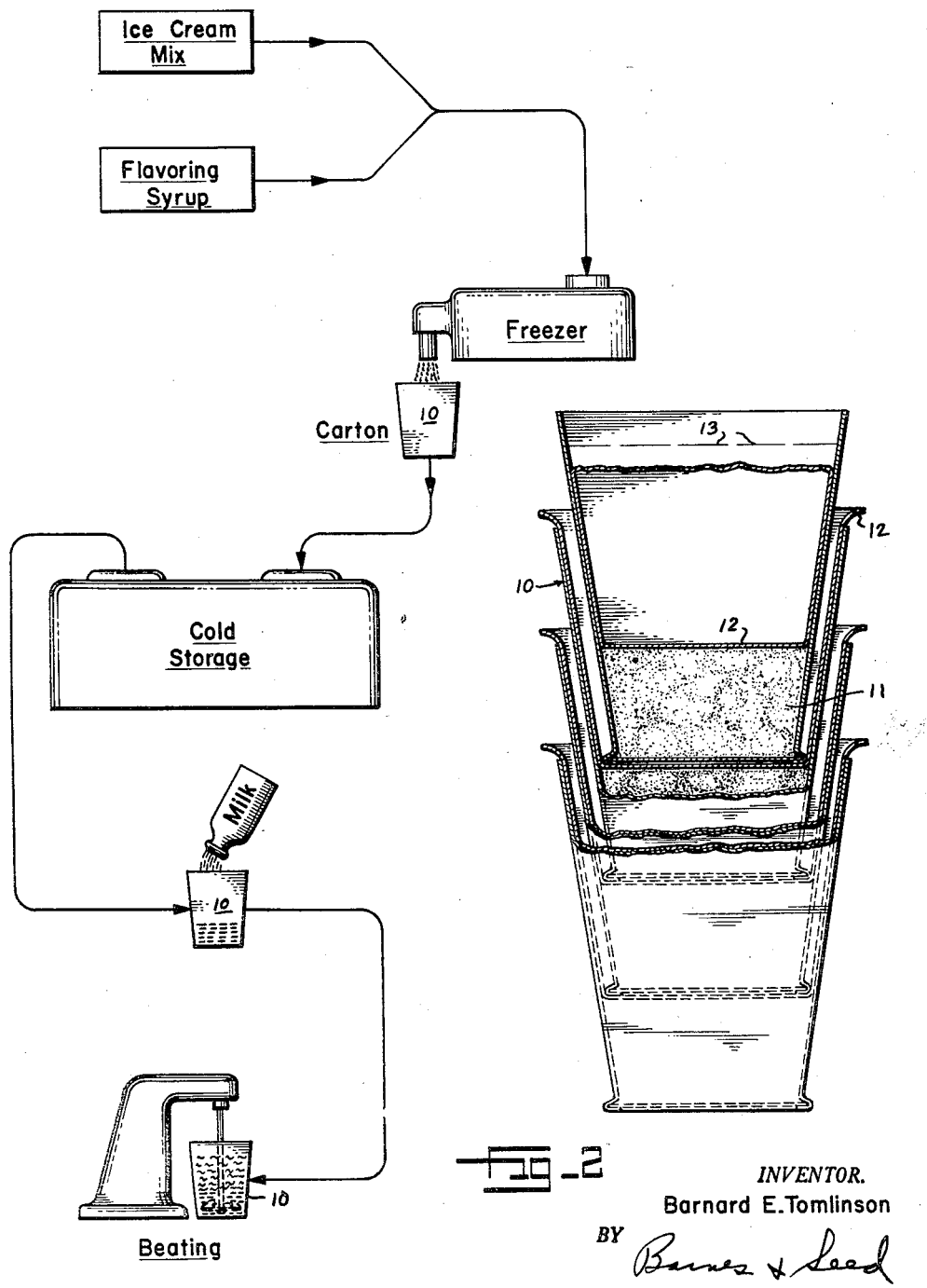
INVENTOR.
Barnard E. Tomlinson
BY
Attorneys

United States Patent Office 2,941,885
Patented June 21, 1960

2,941,885

MILKSHAKE ART

Barnard E. Tomlinson, 630 Ninth Ave.,
Walla Walla, Wash.

Filed Feb. 18, 1957, Ser. No. 640,948

3 Claims. (Cl. 99—54)

The present invention relates to an improved process for making milkshakes, and particularly milkshakes flavored with sugar containing flavoring.

In the past milkshakes have been made basically in one of two ways. The original and still common method is to mix ice cream (soft or hard), flavoring syrup, and milk in a container and beat them together to the desired consistency, the relative amounts of milk and ice cream, and the length of beating time, being varied according to the desired thickness of shake. To a considerable degree this has been a hit or miss operation since the shake making personnel normally dispense the ingredients by eye. As a result uniformity is not achieved and an overage of one or more of the ingredients frequently occurs.

In recent years there has been developed shake makers which are of similar construction to soft ice cream machines and into which ice cream mix, flavoring syrup and milk in batch quantities sufficient for several milkshakes are introduced and frozen under closely controlled conditions, while being beat to a rather thick milkshake consistency. Such a piece of equipment is relatively expensive, requires a trained operator, and is limited to a single flavor per batch. In lieu of the operator combining an ice cream mix and milk, dairies now frequently supply a shake mix which is essentially a diluted ice cream mix so that the operator of the shake maker need only introduce shake mix and flavoring syrup to the machine.

In any regard, the present invention aims to provide an improved process for making milkshakes, and which includes the providing of a frozen product which can be made into a flavored milkshake without pre-thawing or without the addition of flavoring, merely by adding milk and beating.

With yet additional objects and advantages in view which, with the foregoing, will appear and be understood in the course of the following description and claims, the invention consists in the novel adaptation, combination and use of the parts and ingredients hereinafter described.

In the accompanying drawings:

Figure 1 is a schematical view illustrating the steps of my novel process.

Fig. 2 is an elevational view partly in vertical section illustrating a gang of my novel frozen product for making milkshakes.

For a ready understanding of this invention the term "ice cream mix" must be made familiar. There are several practical formulas for such mixes prepared and supplied by dairies to ice cream machine proprietors. The mixes are generally denoted by the percentage of butter fat contained, the more common being a 4% low fat mix, a 10% regular mix, and a 13% catering mix. Most of the mixes contain sugar, a stabilizer (normally seaweed base), skim milk powder, corn syrup solids, and cream and milk or skim milk. A common preferred method of combining these ingredients is to first put the milk and fat (cream), if any, together and start to heat while gradually sprinkling in all of the skim milk powder and about one-half of the sugar by the time the solution has reached 90° F. The other half of the sugar is continually added as the solution is further warmed. Also, the stabilizer, after having been diluted in cold fluid (water or skim milk) at the rate of one pound of stabilizer per gallon of fluid, is poured into the heating solution. The heating is continued until the mixture reaches 160° F. and this temperature is held for twenty minutes. Then the heated mixture is introduced to a homogenizer for treatment at 2,000 p.s.i. during the first stage, and at 2,500 p.s.i. during the second stage. After this treatment the mixture is cooled immediately down to 35° F. for storage.

A typical 4% mix has its ingredients in the following relative amounts by weight:

Sugar _____ 12.0
Corn syrup solids _____ 4.0
Stabilizer _____ 0.6
Skim milk powder _____ 6.5
Cream and milk or skim milk _____ 77.1 (5.5% B.F.)

Corn syrup is frequently eliminated from the richer mixes as will be noted from the following formula for a typical 13% mix:

Sugar _____ 14.50
Stabilizer _____ 0.36
Skim milk powder _____ 5.00
Cream and milk or skim milk _____ 80.14 (16.2% B.F.)

The skim milk powder may be either low heat or a good grade of high heat powder, the former being preferred. Any mixture of cream and milk or skim milk which totals the desired weight and is standardized to the desired fat test will of course supply the proper amount of serum solids and butterfat. In this latter regard, vegetable fats are sometimes substituted for butterfat. A common suitable stabilizer is "Dricoid G."

In any regard it is to be understood that the above are intended only as examples and that as herein used the term "ice cream mix" is intended to define any mix which when supplied with the desired flavor of flavoring syrup will transform into ice cream the selected flavor when given the normal combined freezing and beating treatment well known in the art. In the past such a mix is dispensed directly from the freezing unit to a container for the customer as "soft" ice cream or is dispensed into cartons and then frozen solid in a deep freeze and stored, ideally at from 0° to 6° F., for eventual sale as "hard" ice cream. In the past, as before mentioned, both soft and hard ice creams have been beaten together with milk and flavoring syrup to form a milkshake.

The sugar content of ice cream affects the temperature at which it will freeze solid, the relation being an inverse one, that is to say, the higher the sugar content the lower the solid freezing temperature of the ice cream. I utilize this fact by initially over-sugaring conventional ice cream mix before freezing by the use of flavoring syrup. The latter is added in quantities which would be considered as excessive for flavoring ice cream alone, but which, as will hereinafter be shown, is calculated to supply the flavoring for a predetermined number of flavored milkshakes to be later made by the addition of milk alone to a metered quantity of the hyper-flavored mix after the latter has been frozen under soft ice cream forming conditions and then sub-cooled in storage. To elaborate, in the practice of my invention I initially add 75 gallons of standard flavoring syrup to every 100 gallons of ice cream mix. Such a syrup normally contains sugar solids in the amount of 60 to 68% by weight. This mix is then frozen in a standard commercial ice cream freezer to an overrun of 100% by volume (50% air. As the frozen mix is drawn from the freezer it is metered into milkshake cartons 10 at the rate of 4 ounces by weight to a pint by volume. At this point each carton 10 has a predetermined amount of hyper-flavored soft ice cream 11.

It will be noted that the cartons 10 are tapered outwardly above the level of the ice cream 11, the amount of the taper being such that the cartons will nest down to this level as shown in Fig. 2. For sanitary purposes it is desirable before nesting the cartons to cover the ice cream in each carton with a cupped liner or lid 12 formed, for example, of waxed paper, and which may extend above the rim of the carton for easy removal. Nests of the cartons are then conventionally stored under the deep freeze conditions for hard ice cream, normally from 0° to 6° F. as afore-mentioned. Of utmost importance at this point is to understand that the ice cream 11, because of its unusually high sugar content due to the initial introduction of the flavoring syrup, will not freeze solid in this storage temperature range but will remain in a semi-solid state. In fact, when the proportions of flavoring syrup and ice cream mix outlined above are used, with the latter having 12% sugar by weight, the mixture will not freeze solid until storage temperatures of approximately −25° F. are reached.

To make a milkshake it is only necessary to add milk to the hyper-flavored ice cream 11 in a carton 10. Because this ice cream is still in a semi-solid state the milk and ice cream can be readily beat together to a smooth uniform consistency without need of pre-thawing the ice cream. Furthermore, no flavoring is required to be added because sufficient flavoring for the milk shake is contained in the quantity of ice cream in the carton.

From the foregoing it will be apparent that the nesting cartons 10 with their hyper-flavored ice cream 11 can be stored in a minimum of space and can be easily handled. When marketed to fountain or other eating outlets the help need only select from the freezer a carton having ice cream of the flavor selected by the customer, add milk to a level 13 indicated near the top of the carton and apply to an electric beater. In this manner considerable labor is saved and uniformity of product assured. Furthermore the only equipment required is a beater and a freezer for storage. The product is also ideal for grocery or drug store marketing directly to the consumer who can store it at home in his refrigerator preparatory to adding milk and beating.

The advantages of the invention, it is thought, have been clearly understood from the foregoing detailed description of the embodiment which I have elected to illustrate. Minor changes in the details will suggest themselves and may be resorted to without departing from the spirit of the invention, wherefore it is my intention that no limitations be implied and that the hereto annexed claims be given a scope fully commensurate with the broadest interpretation to which the employed language admits.

I claim:

1. A method of making milkshakes comprising the steps of blending ice cream mix together with sufficient flavoring syrup to give the resulting flavored mix a solid-state freezing point below zero degrees Fahrenheit, freezing and combining the flavored mix with air to form hyper-flavored soft ice cream containing about 50% air by volume, dividing said soft ice cream into individual portions, storing said portions at a temperature of about zero degrees Fahrenheit and, subsequent thereto, blending predetermined charges of liquid milk with said soft ice cream portions.

2. A method of making milkshakes comprising the steps of blending ice cream mix together with sufficient flavoring syrup to give the resulting flavored mix a solid-state freezing point below zero degrees Fahrenheit, freezing and combining the flavored mix with air to form hyper-flavored soft ice cream containing about 50% air by volume, dividing said soft ice cream into individual portions and separately packaging each said portion to seal it from the atmosphere, storing said packaged portions at a temperature of about zero degrees Fahrenheit and, subsequent thereto, blending predetermined charges of liquid milk with said soft ice cream portions after unsealing the latter.

3. A method of making milkshakes comprising the steps of blending ice cream mix together with sufficient flavoring syrup to give the resulting flavored mix a solid-state freezing point below zero degrees Fahrenheit, freezing and combining the flavored mix with air to form hyper-flavored soft ice cream containing about 50% air by volume, dispensing individual portions of said soft ice cream into respective containers with the latter being only partly filled thereby, placing covers over said portions to seal them from the atmosphere, storing said portions at a temperature of about zero degrees Fahrenheit and, subsequent thereto, and after removing the respective said covers, adding liquid milk to each container to a predetermined level therein and blending it with the said soft ice cream portion therein.

References Cited in the file of this patent

UNITED STATES PATENTS

| 1,366,839 | Schnackenberg | Jan. 25, 1921 |
| 1,592,395 | Sulzberger | July 13, 1926 |
| 1,781,249 | Scholl | Nov. 11, 1930 |
| 2,164,351 | Samson | July 4, 1939 |
| 2,672,419 | North | Mar. 16, 1954 |
| 2,667,422 | Kauffman | Jan. 26, 1954 |
| 2,667,423 | Simpson | Jan. 26, 1954 |
| 2,738,279 | Stimpson et al. | Mar. 13, 1956 |
| 2,743,664 | Dale | May 1, 1956 |